US012573696B2

(12) United States Patent
Yong et al.

(10) Patent No.: US 12,573,696 B2
(45) Date of Patent: Mar. 10, 2026

(54) SECONDARY BATTERY

(71) Applicant: Samsung SDI Co., Ltd., Yongin-si (KR)

(72) Inventors: Jun Sun Yong, Yongin-si (KR); Min Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 582 days.

(21) Appl. No.: 18/071,418

(22) Filed: Nov. 29, 2022

(65) Prior Publication Data

US 2023/0178833 A1 Jun. 8, 2023

(30) Foreign Application Priority Data

Dec. 3, 2021 (KR) ........................ 10-2021-0171828

(51) Int. Cl.
| | |
|---|---|
| *H01M 50/188* | (2021.01) |
| *H01M 50/103* | (2021.01) |
| *H01M 50/15* | (2021.01) |
| *H01M 50/176* | (2021.01) |
| *H01M 50/531* | (2021.01) |
| *H01M 50/553* | (2021.01) |

(52) U.S. Cl.
CPC ....... *H01M 50/188* (2021.01); *H01M 50/103* (2021.01); *H01M 50/15* (2021.01); *H01M 50/176* (2021.01); *H01M 50/531* (2021.01); *H01M 50/553* (2021.01)

(58) Field of Classification Search
CPC ............. H01M 50/188; H01M 50/531; H01M 50/553; H01M 50/176; H01M 50/103; H01M 50/15
See application file for complete search history.

(56) References Cited

U.S. PATENT DOCUMENTS

| | | |
|---|---|---|
| 8,623,548 B2 | 1/2014 | Kim et al. |
| 9,236,596 B2 | 1/2016 | Kim |
| 9,350,010 B2 | 5/2016 | Byun et al. |
| | (Continued) | |

FOREIGN PATENT DOCUMENTS

| | | |
|---|---|---|
| CN | 102856523 A | 1/2013 |
| CN | 107978699 A | 5/2018 |
| | (Continued) | |

OTHER PUBLICATIONS

Extended European Search Report issued in corresponding application No. EP 22211027.2, dated Apr. 26, 2023, 7 pages.

(Continued)

*Primary Examiner* — Basia A Ridley
*Assistant Examiner* — Heng M. Chan
(74) *Attorney, Agent, or Firm* — Womble Bond Dickinson (US) LLP

(57) ABSTRACT

A secondary battery includes: a case having an internal space; an electrode assembly accommodated in the internal space of the case; a current collector electrically connected to the electrode assembly; and a cap assembly. The cap assembly includes: a cap plate sealing the case; an electrode terminal coupled to the current collector through the cap plate; and a gasket between the electrode terminal and the cap plate. The gasket has a flange portion, and the flange portion of the gasket is between an upper surface of the cap plate and the electrode terminal.

16 Claims, 3 Drawing Sheets

(56) References Cited

U.S. PATENT DOCUMENTS

| | | | |
|---|---|---|---|
| 9,406,925 | B2 | 8/2016 | Seo et al. |
| 10,547,030 | B2 | 1/2020 | Lee et al. |
| 10,651,454 | B2 | 5/2020 | Jang et al. |
| 10,756,327 | B2 | 8/2020 | Xing |
| 11,688,914 | B2 | 6/2023 | Xing |
| 2010/0233528 | A1* | 9/2010 | Kim .................... H01M 50/564 |
| | | | 429/178 |
| 2011/0200870 | A1 | 8/2011 | Kim et al. |
| 2011/0305943 | A1 | 12/2011 | Byun et al. |
| 2012/0225348 | A1 | 9/2012 | Kim |
| 2013/0004833 | A1 | 1/2013 | Kim |
| 2013/0095374 | A1* | 4/2013 | Kim .................... H01M 50/553 |
| | | | 429/179 |
| 2014/0023914 | A1 | 1/2014 | Okutani et al. |
| 2015/0263330 | A1 | 9/2015 | Seo et al. |
| 2016/0308188 | A1 | 10/2016 | Jang et al. |
| 2018/0114954 | A1 | 4/2018 | Lee et al. |
| 2019/0221827 | A1 | 7/2019 | Xing |
| 2020/0335765 | A1 | 10/2020 | Xing |
| 2021/0175567 | A1 | 6/2021 | Kim et al. |

FOREIGN PATENT DOCUMENTS

| | | | |
|---|---|---|---|
| CN | 111799401 | A | 10/2020 |
| CN | 214280082 | U | 9/2021 |
| EP | 2 495 784 | A2 | 9/2012 |
| EP | 2 541 650 | A1 | 1/2013 |
| JP | 2015-164102 | A | 9/2015 |
| KR | 10-2011-0134740 | A | 12/2011 |
| KR | 10-1116492 | B | 2/2012 |
| KR | 10-2015-0106227 | A | 9/2015 |
| KR | 10-2016-0123853 | A | 10/2016 |
| WO | WO 2022/085991 | | 4/2022 |

OTHER PUBLICATIONS

Chinese Office Action issued in corresponding CN Patent Application No. 202211542139.X, dated Aug. 16, 2025, 8 pages.
Korean Office Action issued in corresponding KR Application No. 10-2021-0171828, dated Nov. 14, 2025, 6 pages.

* cited by examiner

SECONDARY BATTERY

CROSS-REFERENCE TO RELATED APPLICATION

This application claims priority to and the benefit of Korean Patent Application No. 10-2021-0171828, filed on Dec. 3, 2021, in the Korean Intellectual Property Office, the entire content of which is herein incorporated by reference.

BACKGROUND

1. Field

Aspects of embodiments of the present disclosure relate to a secondary battery.

2. Description of the Related Art

Unlike a primary battery that is not designed to be recharged, a secondary battery is designed to be a rechargeable and dischargeable battery. A low-capacity secondary battery including one single cell packaged in the form of a pack may be used for various portable small-sized electronic devices, such as cellular phones or camcorders. In addition, a high-capacity secondary battery in which several tens of cells are connected in a battery pack is widely used as a power source for motor drives, such as those in hybrid vehicles or electric vehicles.

When such a secondary battery is mounted in an electronic device or vehicle, the secondary battery is exposed to vibration or shock due to external environments. In addition, when the secondary battery is repeatedly subject to vibration or shock, the inside of the secondary battery may be affected, causing malfunction. Accordingly, it is desirable to provide a structure for alleviating vibration or shock applied to the secondary battery.

SUMMARY

According to embodiments of the present disclosure, a secondary battery is provided that has increased coupling force of electrode terminals and increased internal space efficiency.

According to an embodiment of the present disclosure, a secondary battery includes: a case having an internal space; an electrode assembly accommodated in the internal space of the case; a current collector electrically connected to the electrode assembly; and a cap assembly. The cap assembly includes: a cap plate sealing the case; an electrode terminal coupled to the current collector extending through the cap plate; and a gasket between the electrode terminal and the cap plate. The gasket has a flange portion, and the flange portion of the gasket is between an upper surface of the cap plate and the electrode terminal.

The electrode terminal may include a flange portion, and the gasket may extend in a longitudinal direction from the upper surface of the cap plate along the flange portion of the electrode terminal.

The electrode terminal may include a flange portion extending in a horizontal direction of an upper portion of the cap plate, and the flange portion of the electrode terminal may be coupled to an upper surface of the gasket.

The flange portion may extend along a periphery of a body of the electrode terminal, and the electrode terminal may be coupled to the cap plate by the flange portion of the electrode assembly and the gasket extending around a lower portion of the body.

The secondary battery may further include a fastening plate between the gasket and the cap plate.

The fastening plate may have a terminal hole through which the electrode terminal passes and a protrusion protruding from an inner side of the terminal hole, and the protrusion of the fastening plate may be coupled to an end of the gasket.

The electrode terminal may include a flange portion extending in a horizontal direction of an upper portion of the cap plate, and the protrusion of the fastening plate may be outside the flange portion of the electrode terminal.

The secondary battery may further include a retainer. The current collector may include a first region coupled to the electrode assembly and a second region extending from the first region and coupled to the electrode terminal, and the retainer may be coupled to a lower portion of the second region of the current collector.

The retainer may extend in a longitudinal direction of the electrode assembly along the second region.

The secondary battery may include an insulating plate between the electrode assembly and the cap plate, and the retainer may be coupled to the insulating plate.

DETAILED DESCRIPTION

Figure 1:
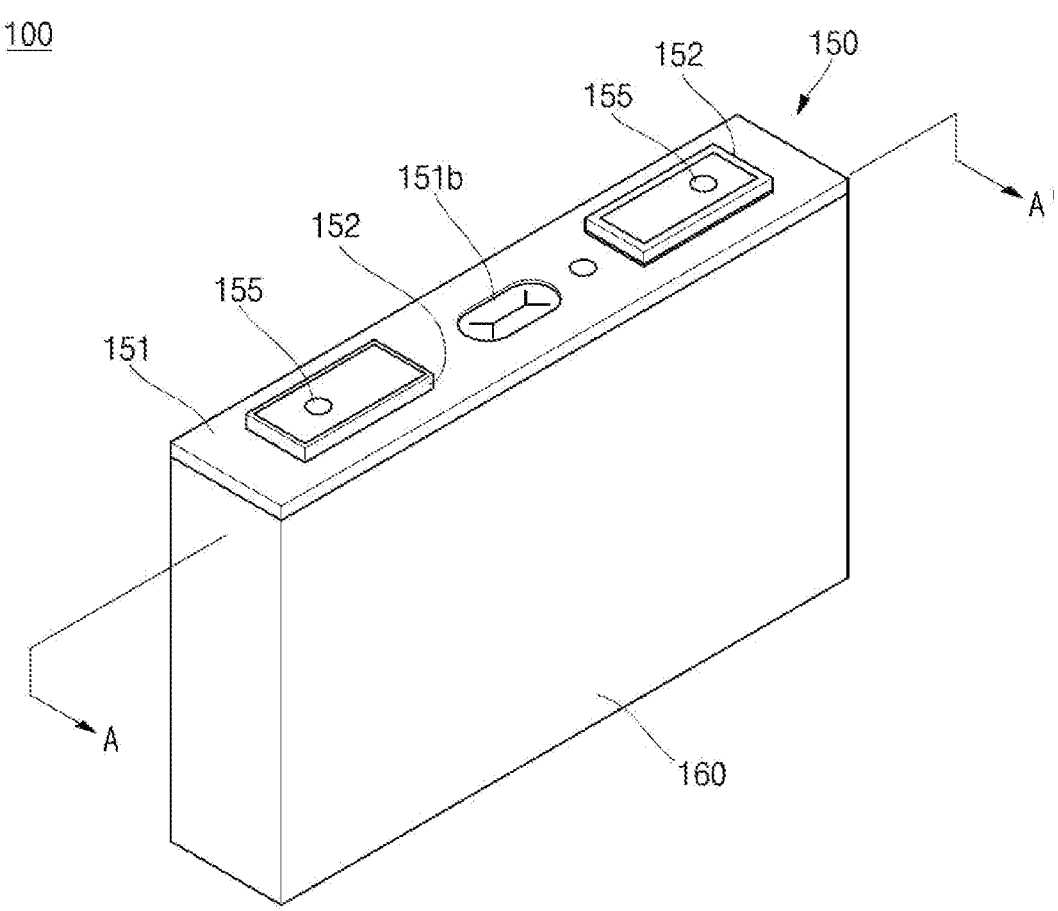
FIG. 1 is a perspective view of a secondary battery according to an embodiment of the present disclosure.

Embodiments of the present disclosure will now be described in detail such that they may be easily implemented by a person of ordinary skill in the technical field to which the present disclosure belongs with reference to the drawings.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
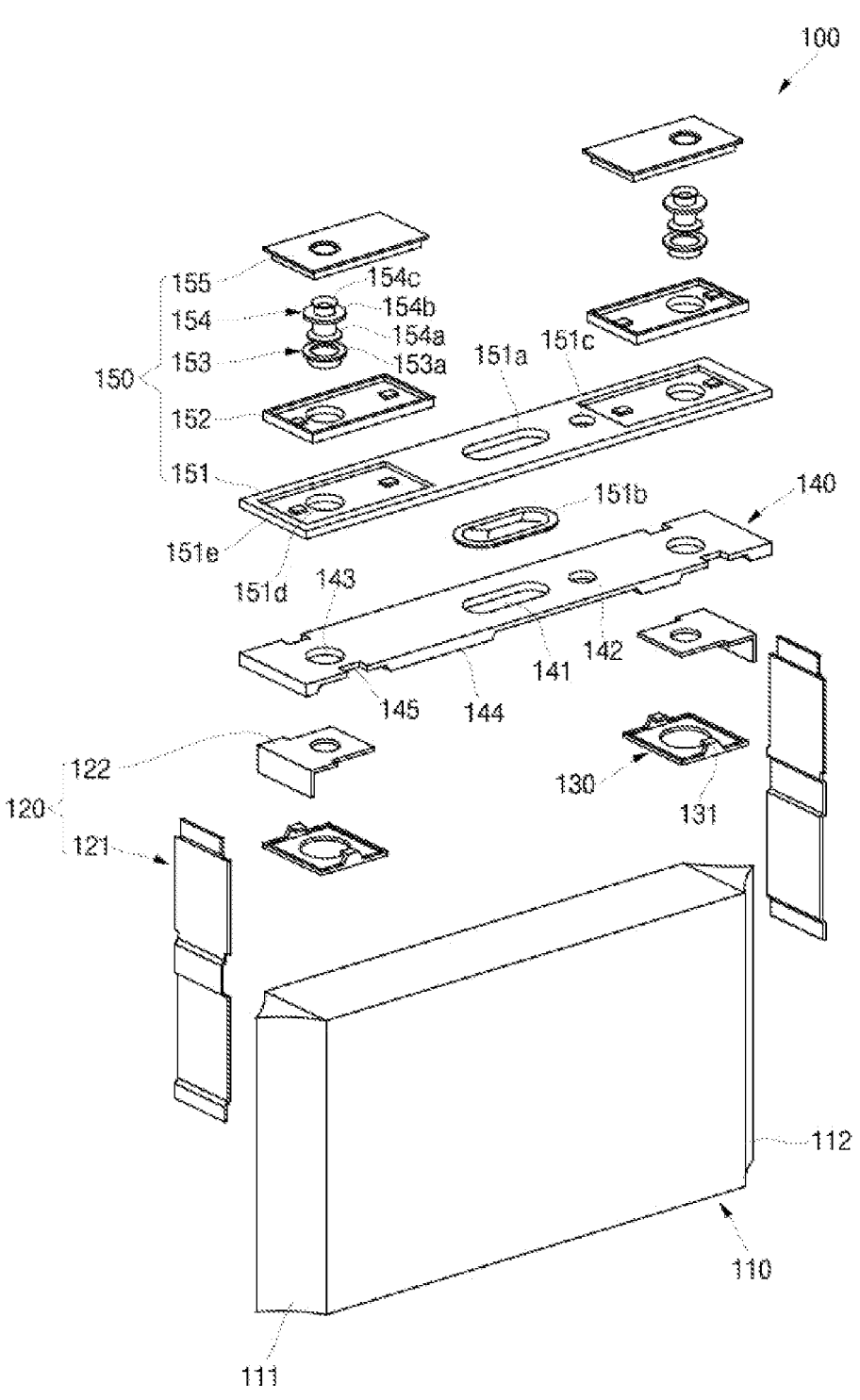
FIG. 2 is an exploded perspective view of the secondary battery shown in FIG. 1.
Figure 3:
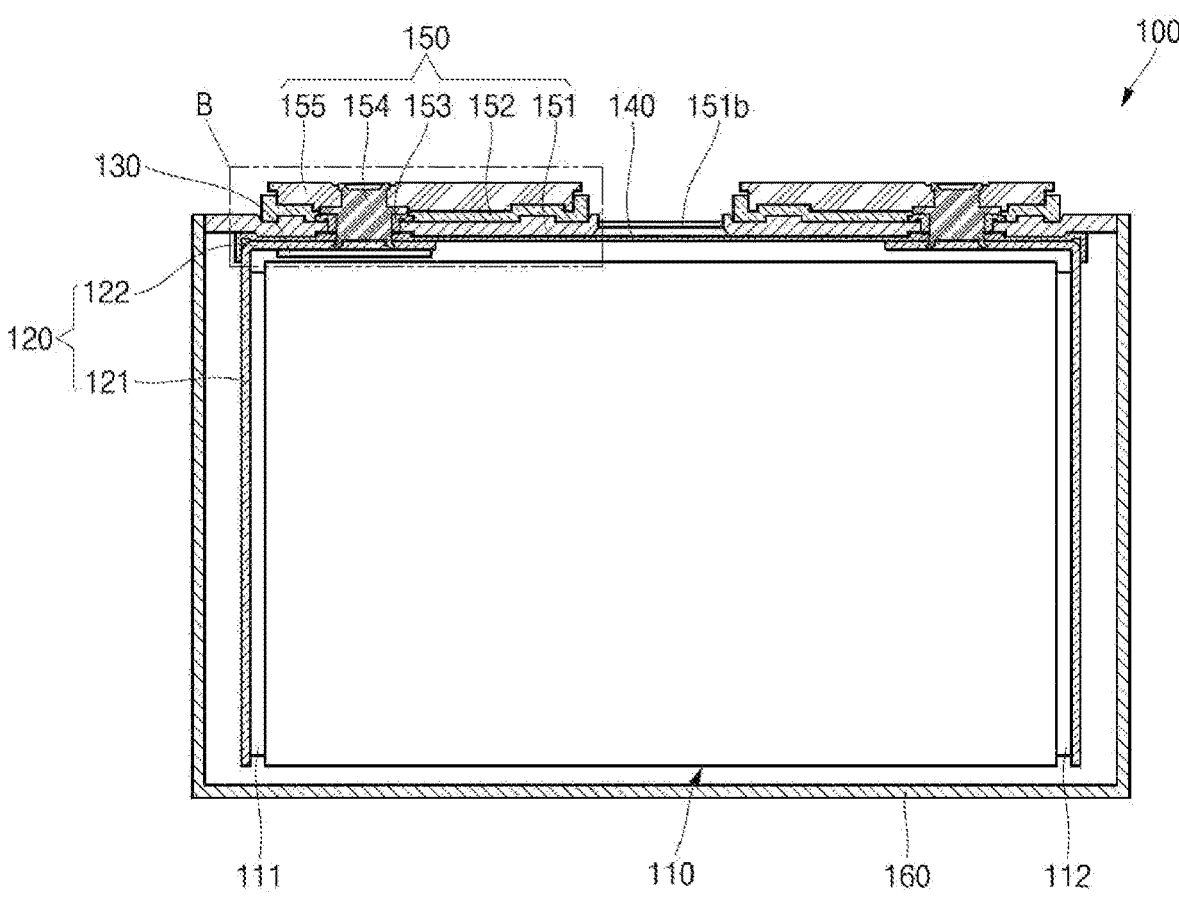
FIG. 3 is a cross-sectional view taken along the line A-A' of FIG. 1.
Figure 4:
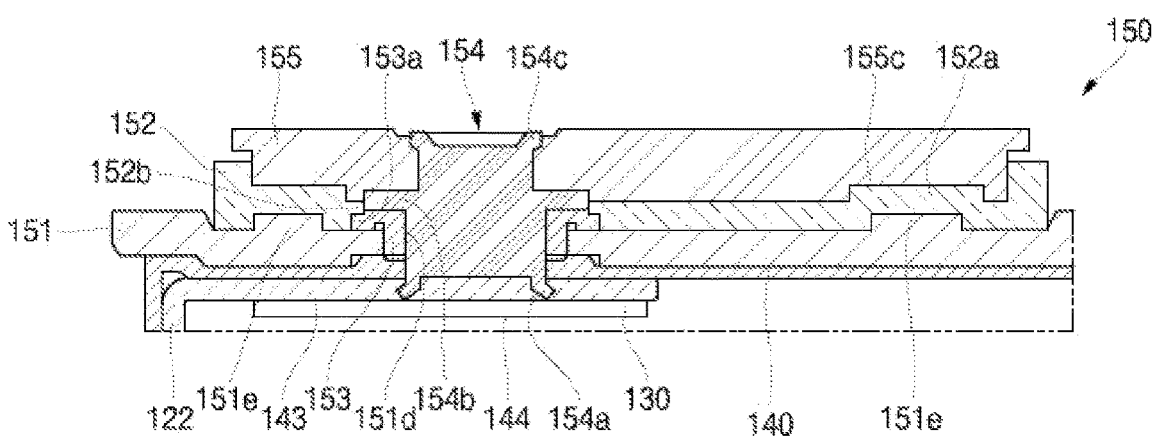
FIG. 4 is a partially exploded perspective view showing the portion B of FIG. 3.

FIG. 1 is a perspective view of a secondary battery according to an embodiment of the present disclosure. FIG. 2 is an exploded perspective view of the secondary battery shown in FIG. 1. FIG. 3 is a cross-sectional view taken along the line A-A' of FIG. 1. FIG. 4 is a partially exploded perspective view showing the portion B of FIG. 3.

Referring to FIGS. 1 to 4, the secondary battery 100 according to an embodiment of the present disclosure includes an electrode assembly 110, a current collector plate 120, a retainer 130, an insulating plate 140, a cap assembly 150, and a case 160.

The electrode assembly 110 is formed by stacking or winding a laminate of a first electrode plate, a separator, and a second electrode plate formed in thin plate shapes or film shapes. The first electrode plate may act as a negative electrode, and the second electrode plate may act as a positive electrode. Of course, in other embodiments, the first electrode plate and the second electrode plate may have any polarities as long as they have different polarities from each other.

The first electrode plate is formed by coating a first electrode active material, such as graphite or carbon, on a first electrode current collector made of a metal foil, such as copper or nickel, and includes a first electrode uncoated portion that is a region to which the first active material is not applied. The first electrode uncoated portion provides a passage for current flow between the first electrode plate and the outside. The material of the first electrode plate is not limited to the above examples.

In addition, the uncoated portion of the first electrode plate may form a first current collection tab 111. A plurality of first current collection tabs 111 may be formed to protrude from the first electrode plate. In an embodiment having a stacked structure, the first current collection tabs 111 may be formed to protrude from the first electrode plate in a direction (e.g., a predetermined direction) to overlap at one side. In addition, in an embodiment having a winding (or wound) structure, the first current collection tabs 111 may be formed by arranging uncoated portions at a distance (e.g., a pre-calculated distance) from the first electrode plate so that the first current collection tabs 111 protrude from the same area after being wound to overlap. Because the first current collection tabs 111 are integrally formed with the first electrode plates and are drawn out from (e.g., extend from) each of the first electrode plates, the current collection efficiency from the electrode assembly 110 can be increased. However, in other embodiments, the first current collection tabs 111 may be formed by using a separate member different from the first electrode plates.

The second electrode plate is formed by coating a second electrode active material, such as a transition metal oxide, on a second electrode current collector made of a metal foil, such as aluminum, and may include a second electrode uncoated portion that is a region to which the second active material is not applied. In addition, a second current collection tab 112 may be formed from the uncoated portion of the second electrode plate to correspond to the first current collection tab 111. Accordingly, the second current collection tab 112 may also have a multi-tap structure, similar to the first current collection tab 111. Further, the material of the second electrode plate is not limited to the above examples.

The separator is positioned between the first electrode plate and the second electrode plate to prevent a short circuit therebetween and to enable movement of lithium ions. The separator may be made of polyethylene, polypropylene, or a composite film of polyethylene and polypropylene. The material of the separator is not limited to the above examples.

The electrode assembly 110 may be substantially accommodated in the case 160 together with an electrolyte. The electrolyte may include a lithium salt, such as $LiPF_6$ or $LiBF_4$, in an organic solvent, such as ethylene carbonate (EC), propylene carbonate (PC), diethyl carbonate (DEC), ethyl methyl carbonate (EMC), or dimethyl carbonate (DMC). The electrolyte may be in a liquid, solid, or gel form.

The first current collection tab 111 and the second current collection tab 112 are electrically connected to the current collector plate 120. A pair of current collector plates 120 may be provided and may be electrically connected to the first current collection tab 111 and the second current collection tab 112 of the electrode assembly 110, respectively. The current collector plates 120 are respectively connected to the first current collection tab 111 and the second current collection tab 112 of the electrode assembly 110. For example, the current collector plates 120 are in contact with the first current collection tab 111 and the second current collection tab 112 protruding from the side portion of the electrode assembly 110, and, in this state, can be coupled to each other, by a process such as welding. Accordingly, the current collector plates 120 may be electrically connected to each of the first current collection tab 111 and the second current collection tab 112. For example, the current collector plate 120 electrically connected to the first current collection tab 111 may have a negative polarity, and the current collector plate 120 electrically connected to the second current collection tab 112 may have a positive polarity.

Each of the current collector plates 120 may include a first region (e.g., a first portion) 121 and a second region (e.g., a second portion) 122. In some embodiments, the first regions 121 may be arranged in a direction parallel to the first current collection tab 111 or the second current collection tab 112 of the electrode assembly 110, and in this state, the first current collection tab 111 and the second current collection tab 112 may be welded thereto. In addition, the second regions 122 may be coupled to the first regions 121 by a process, such as welding, on the upper portion (e.g., upper end or upper area) of the first region 121. However, in some embodiments, the first region 121 and the second region 122 may be provided integrally.

Accordingly, the current collector plate 120 having the first region 121 with the second region 122 coupled thereto may have the same polarity as the first current collection tab 111 and the second current collection tab 112, respectively.

The retainer 130 may be coupled to a lower portion of the second region 122 of the current collector plate 120. The retainer 130 is made of an electrical insulator and may couple the current collector plate 120 to the insulating plate 140 located thereon. To this end, the retainer 130 may have a hook 131 protruding upwardly in at least two areas and may be fastened to the insulating plate 140 by the hook 131. Accordingly, the second region 122 of the current collector plate 120 is fixed to the insulating plate 140, and the electrode assembly 110 coupled to the first region 121 of the current collector plate 120 may remain coupled to the insulating plate 140.

The insulating plate 140 may extend in parallel from an upper portion of the electrode assembly 110 in a horizontal direction. The insulating plate 140 may be made of an insulating polymer, such as polypropylene (PP), polyethylene (PE), or polystyrene (PS). The insulating plate 140 may have a vent hole (e.g., a vent opening) 141 located at substantially the center thereof in the horizontal direction of the electrode assembly 110, an injection hole (e.g., an injection opening) 142 formed to be spaced apart from one side of the vent hole 141, and terminal holes (e.g., terminal openings) 143 located at both ends of the electrode assembly 110 in the horizontal direction.

In addition, the insulating plate 140 may have a hook fastening groove 145 formed in a part of the side surface 144 to be fastened to the hook 131 of the retainer 130, described above. For example, the hook 131 of the retainer 130 protrudes upwardly through the hook fastening groove 145 in the insulating plate 140, and the lower end of the hook 131 may be caught on the upper surface of the insulating plate 140, thereby maintaining a fastened state.

The cap assembly 150 is formed on the insulating plate 140 and is coupled to the case 160 to seal the case 160. For example, the cap assembly 150 may include a cap plate 151, a fastening plate 152, a gasket 153, an electrode terminal 154, and a terminal plate 155.

The cap plate 151 is formed in a plate shape, is coupled to an opening of the case 160, and may be formed of the same material as the case 160. The cap plate 151 may be coupled to the case 160 by, for example, laser welding. The cap plate 151 may be electrically independent (e.g., electrically neutral) or may be electrically connected to either the first current collection tab 111 or the second current collection tab 112 in various embodiments. For example, the cap plate 151 may be electrically connected to the second current collection tab 112, and in such an embodiment, the cap plate 151 and the case 160 have the same polarity (e.g., the positive polarity). In other embodiments, the cap plate 151 may be electrically connected to the first current collection tab 111.

A vent hole (e.g., a vent opening) 151a may be formed at approximately the center of the cap plate 151, and a safety vent 151b formed to have a relatively small thickness, compared to other regions, may be formed inside the vent hole 151a. If the internal pressure of the case 160 becomes higher than a rupture pressure, the safety vent 151b ruptures (e.g., bursts) to prevent the secondary battery 100 from exploding.

In addition, an electrolyte injection hole (e.g., an electrolyte injection opening) 151c for injecting an electrolyte may be formed at one side of the cap plate 151. The electrolyte is injected into the case 160 through the electrolyte injection hole 151c, and the electrolyte injection hole 151c is then sealed by a plug.

In addition, terminal holes (e.g., terminal openings) 151d through which the electrode terminals 154 pass are formed at both sides of the cap plate 151, and a gasket 153 and an electrode terminal 154 are coupled to the terminal holes 151d, respectively.

In addition, fastening protrusions 151e formed around the terminal holes 151d may be further formed on both sides of the cap plate 151, and regions at where the terminal holes 151d and the fastening protrusion 151e are present may be lower than the cap plate 151 through an entirely engraved region (e.g., by being in a recessed region of the cap plate 151). Accordingly, the position of the fastening plate 152 can be fixed by (or within) the engraved region and the fastening protrusion 151e in the region.

A pair of fastening plates 152 may be provided and may be respectively coupled to both sides of the upper surface of the cap plate 151. The fastening plates 152 are positioned in the engraved region formed in the upper surface of the cap plate 151 and may be coupled to the fastening protrusion 151e of the cap plate 151 by a fastening protrusion 152a. In addition, each of the fastening plates 152 may accommodate the gasket 153 and the electrode terminal 154 through the terminal holes formed therein. In addition, the fastening plate 152 further includes a protrusion 152b protruding a length (e.g., a predetermined length) from inside the terminal hole, and the protrusion 152b presses a gasket 153, to be described later, from the upper portion to fix the position of the gasket 153.

The gasket 153 is made of an insulating material and is coupled to the upper portion of the fastening plate 152 to seal an area between the electrode terminal 154 and the fastening plate 152. The gasket 153 prevents external moisture from penetrating into the secondary battery 100 and prevents the electrolyte contained in the secondary battery 100 from leaking to the outside.

The gasket 153 has a flange portion 153a at an upper end thereof, and the flange portion 153a extends from an upper surface of the cap plate 151 in the horizontal direction.

Accordingly, the electrolyte may not leak between the electrode terminal 154 and the cap plate 151.

In addition, the flange portion 153a can be fixed by pressing the upper surface of the edge by the protrusion 152b formed in the terminal hole of the fastening plate 152. In addition, the flange portion 153a may be fixed by pressing the upper surface of the flange portion 153a by the electrode terminal 154 also to the inside of the edge. Accordingly, the flange portion 153a and the gasket 153 having the flange portion 153a may be fixed between the electrode terminal 154 and the cap plate 151.

The gasket 153 is positioned outside the cap plate 151 when viewed with respect to the cap plate 151. Accordingly, because the internal space of the secondary battery partitioned by the cap plate 151 and the case 160 is increased, the battery capacity can be increased.

The electrode terminal 154 is coupled through a hole (e.g., an opening) formed in the gasket 153, and accordingly, the electrode terminal 154 may be sequentially coupled to the fastening plate 152, the cap plate 151, the insulating plate 140, and the second region 122 of the current collector plate 120, positioned below the electrode terminal 154, in that order. The electrode terminal 154 may include a first rivet portion 154a provided at the lower end around the basic body portion and coupled to the second region 122 of the current collector plate 120, a flange portion 154b positioned at an approximate central height of the first rivet portion 154a to be coupled to the second rivet portion 154c, and a second rivet portion 154c provided on the upper end of the body portion to be coupled to the terminal plate 155.

The first rivet portion 154a may be formed to protrude along the lower end of the body portion. The first rivet portion 154a may be in contact with the second region 122 of the current collector plate 120 and may be deformed through riveting to be fastened to the second region 122. Accordingly, through the first rivet portion 154a, the electrode terminal 154 has the same polarity as that of the current collector plate 120.

The flange portion 154b extends in the horizontal direction from the approximate center of the electrode terminal 154. when the first rivet portion 154a passes through the terminal hole 151d in the cap plate 151 together with the gasket 153 and is coupled thereto, the flange portion 154b presses the upper surface of the flange portion 153a of the gasket 153. Accordingly, the flange portion 154b can fix the gasket 153 and increase a sealing force. In addition, the coupling area between the flange portion 154b and the gasket 153 is located outside the cap plate 151. Accordingly, the internal space in the case 160 may be increased, thereby increasing battery capacity and increasing efficiency.

The second rivet portion 154c may protrude upwardly from the body portion and may be riveted to the terminal plate 155 positioned at the uppermost portion. In addition, a separate welding process can be performed along the edge of the riveted second rivet portion 154c.

The terminal plate 155 is coupled to the electrode terminals 154 protruding to (or protruding from) an upper portion of the cap plate 151, respectively, through the terminal holes 151d in the cap plate 151. After the terminal plate 155 is coupled to the electrode terminal 154, the second rivet portion 154c of the electrode terminal 154 is riveted or welded together thereto, thereby fixing the electrode terminal 154 to the terminal plate 155.

The case 160 may be made of a conductive metal, such as aluminum, an aluminum alloy, or nickel-plated steel, and has a substantially hexahedral shape having an opening through which the electrode assembly 110 can be inserted and seated.

The cap plate 151 is coupled to the case 160 at the opening therein to seal the case 160. The inner surface of the case 160 is insulated to prevent an electrical short from occurring therein. In addition, in some embodiments, one electrode of the electrode assembly 110 may be electrically connected to the case 160 through the cap plate 151. In such embodiments, an electrical short circuit inside the case 160 is prevented by the inner insulation treatment. In such embodiments, the case 160 may act as a positive electrode.

As described above, the secondary battery according to embodiments of the present disclosure includes a gasket coupled to an electrode terminal, and because a fastening portion between the electrode terminal and the gasket is positioned outside the cap plate, the internal space in the case is increased, thereby increasing battery capacity.

The foregoing embodiments are only some of the embodiment for carrying out the secondary battery according to the present disclosure, which is not limited to the above-described embodiments. It will be understood by a person skilled in the art that various changes in form and details may be made therein without departing from the spirit and scope of the present disclosure as defined by the following claims and their equivalents.

What is claimed is:

1. A secondary battery comprising:
 a case having an internal space;
 an electrode assembly accommodated in the internal space of the case;
 a current collector electrically connected to the electrode assembly; and
 a cap assembly comprising:
  a cap plate sealing the case;
  an electrode terminal coupled to the current collector and extending through the cap plate;
  a gasket between the electrode terminal and the cap plate and having a flange portion, the flange portion of the gasket being between an upper surface of the cap plate and the electrode terminal; and
  a fastening plate having a terminal hole through which the electrode terminal passes and a protrusion protruding from an inner side of the terminal hole toward the electrode terminal, the protrusion of the fastening plate contacting an upper surface of the flange portion of the gasket.

2. The secondary battery of claim 1, wherein the electrode terminal comprises a flange portion, and
 wherein the flange portion of the gasket extends in a longitudinal direction from the upper surface of the cap plate along the flange portion of the electrode terminal.

3. The secondary battery of claim 1, wherein the electrode terminal comprises a flange portion extending in a horizontal direction of the upper surface of the cap plate, and
 wherein the flange portion of the electrode terminal is coupled to an upper surface of the gasket.

4. The secondary battery of claim 3, wherein the flange portion of the electrode terminal extends along a periphery of a body of the electrode terminal, and
 wherein the electrode terminal is coupled to the cap plate by the flange portion of the electrode terminal and the gasket extending around a lower portion of the body.

5. The secondary battery of claim 1, wherein the fastening plate is between the gasket and the cap plate.

6. The secondary battery of claim 1,
 wherein the protrusion of the fastening plate is coupled to an end of the gasket.

7. The secondary battery of claim 6, wherein the electrode terminal comprises a flange portion extending in a horizontal direction of the upper surface of the cap plate, and wherein the protrusion of the fastening plate is outside the flange portion of the electrode terminal.

8. The secondary battery of claim 1, further comprising a retainer, wherein the current collector comprises a first region coupled to the electrode assembly and a second region extending from the first region and coupled to the electrode terminal, and wherein the retainer is coupled to a lower portion of the second region of the current collector.

9. The secondary battery of claim 8, wherein the retainer extends in a longitudinal direction of the electrode assembly along the second region.

10. The secondary battery of claim 8, further comprising an insulating plate between the electrode assembly and the cap plate, wherein the retainer is coupled to the insulating plate.

11. The secondary battery of claim 2, wherein the flange portion of the gasket is between the flange portion of the electrode terminal and the cap plate.

12. The secondary battery of claim 11, wherein the upper surface of the flange portion of the gasket is in contact with the flange portion of the electrode terminal.

13. The secondary battery of claim 1, wherein the electrode terminal is coupled through a hole formed in the gasket.

14. The secondary battery of claim 1, wherein the current collector comprises a first region coupled to the electrode assembly and a second region extending from the first region and coupled to the electrode terminal, and wherein the electrode terminal comprises a lower first rivet portion and an upper second rivet portion.

15. The secondary battery of claim 14, wherein the first rivet portion is coupled to the second region.

16. The secondary battery of claim 14, further comprising a terminal plate on the cap plate, and wherein the second rivet portion is coupled to the terminal plate.

* * * * *